United States Patent [19]

Miller et al.

[11] 4,330,625
[45] May 18, 1982

[54] LIQUEFYING AQUEOUS STARCH SLURRY FOLLOWED BY SACCHARIFICATION WITH ION EXCHANGE RESIN

[75] Inventors: Franklyn D. Miller, Cincinnati, Ohio; Werner C. Muller, Dobbs Ferry, N.Y.

[73] Assignee: National Distillers & Chemical Corp., New York, N.Y.

[21] Appl. No.: 226,679

[22] Filed: Jan. 21, 1981

Related U.S. Application Data

[63] Continuation-in-part of Ser. No. 129,517, Aug. 28, 1980, Pat. No. 4,266,027.

[51] Int. Cl.³ .......................... C13K 1/06; C12P 7/06
[52] U.S. Cl. ............................... 435/161; 127/38; 127/46.2; 203/19; 203/DIG. 13; 435/99
[58] Field of Search ................ 127/38, 67, 46 A, 46.2; 426/430; 203/19; 435/99, 161

[56] References Cited

U.S. PATENT DOCUMENTS

| | | | |
|---|---|---|---|
| 3,371,018 | 2/1968 | Ewing | 127/38 X |
| 3,463,770 | 8/1969 | Fellers | 127/67 X |
| 3,519,431 | 7/1970 | Wayne | 426/430 X |
| 3,616,220 | 10/1971 | Nisbet | 127/38 X |
| 3,939,281 | 2/1976 | Schwengers | 426/430 X |
| 4,255,518 | 3/1981 | Muller | 127/38 X |
| 4,256,541 | 3/1981 | Muller | 203/19 |
| 4,266,027 | 5/1981 | Muller | 127/46 A X |

*Primary Examiner*—Sidney Marantz
*Attorney, Agent, or Firm*—Kenneth D. Tremain

[57] ABSTRACT

Starch derived from a dry milled cereal grain such as corn or milo is hydrolyzed to provide a sterile aqueous fermentable sugar solution which is especially adapted for fermentative conversion to ethanol with minimum thermal expenditure. Following an initial acid-catalyzed hydrolysis to thin, or liquefy, the starch, substantially all of the water insoluble protein and oil components, and a portion of the water soluble components, e.g., sugars, proteins and vitamins, are separately recovered from the partial starch hydrolysate with the water solubles being recycled to the system. Thereafter, the partial starch hydrolysate is subjected to further hydrolysis in the presence of an acidic cationic exchange resin as catalyst to provide an aqueous solution of fermentable sugar.

17 Claims, 1 Drawing Figure

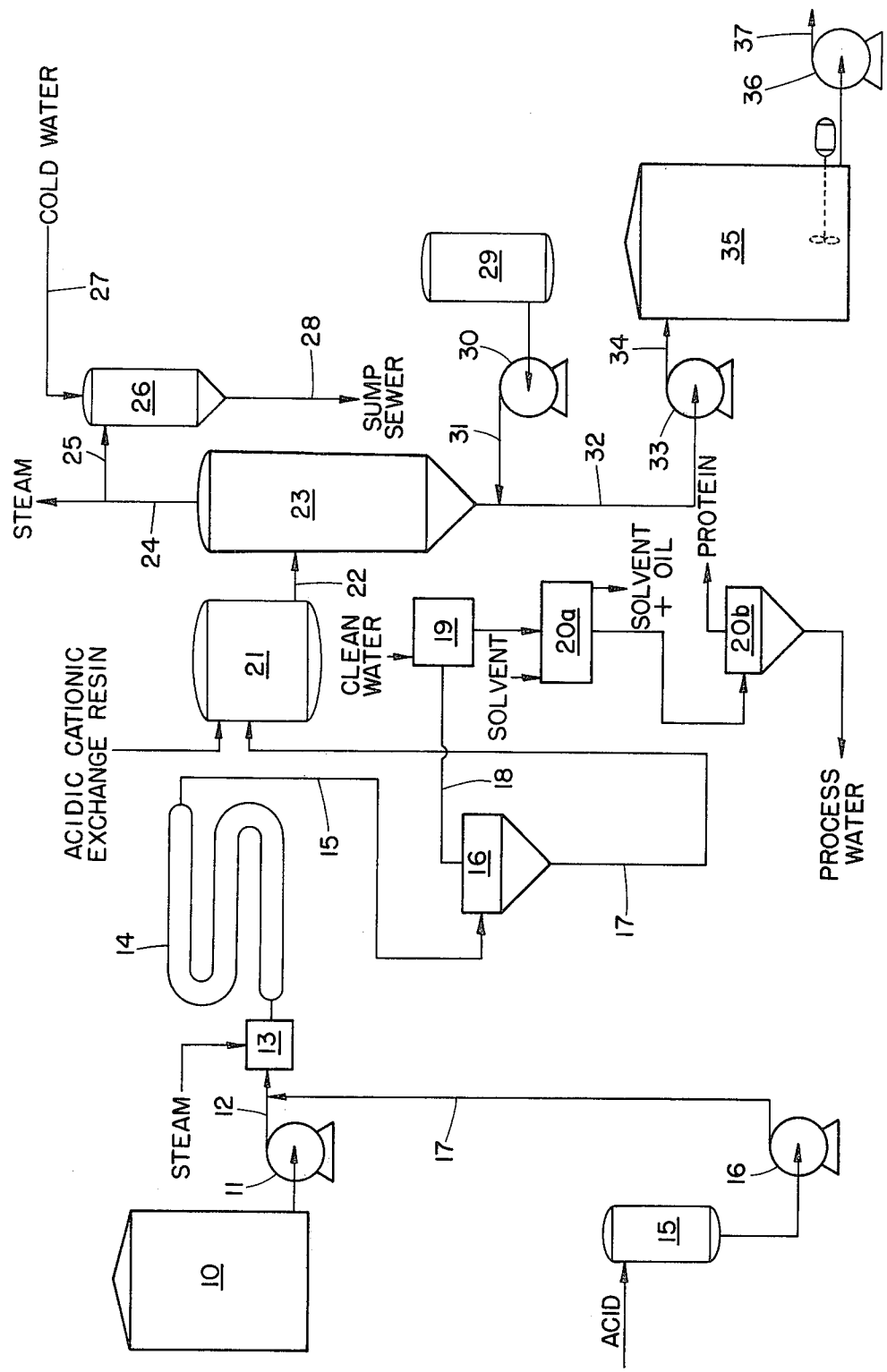

LIQUEFYING AQUEOUS STARCH SLURRY FOLLOWED BY SACCHARIFICATION WITH ION EXCHANGE RESIN

CROSS REFERENCE TO RELATED APPLICATION

This application is a continuation-in-part of commonly assigned, copending U.S. patent application Ser. No. 129,517, filed Aug. 28, 1980 which issued as U.S. Pat. No. 4,266,027 on May 5, 1981.

BACKGROUND OF THE INVENTION

1. Field of the Invention

This invention relates to processes for hydrolyzing starches and more particularly, to such processes especially adapted to provide substrate sugars for the fermentation to ethanol.

2. Description of the Prior Art

With the ever-increasing depletion of economically recoverable petroleum reserves, the production of ethanol from vegetative sources as a partial or complete replacement for conventional fossil-based liquid fuels becomes more attractive. In some areas, the economic and technical feasibility of using a 90% unleaded gasoline-10% anhydrous ethanol blend ("gasohol") has shown encouraging results. According to a recent study, gasohol powered automobiles have averaged a 5% reduction in fuel compared to unleaded gasoline powered vehicles and have emitted one-third less carbon monoxide than the latter. In addition to offering promise as a practical and efficient fuel, biomass-derived ethanol in large quantities and at a competitive price has the potential in some areas for replacing certain petroleum-based chemical feedstocks. Thus, for example, ethanol can be catalytically dehydrated to ethylene, one of the most important of all chemical raw materials both in terms of quantity and versatility.

The various operations in processes for obtaining ethanol from such recurring sources as cellulose, cane sugar, amylaceous grains and tubers, e.g., the separation of starch granules from non-carbohydrate plant matter and other extraneous substances, the chemical and/or enzymatic hydrolysis of starch to fermentable sugar (liquefaction and saccharification), the fermentation of sugar to a dilute solution of ethanol ("beer") and the recovery of anhydrous ethanol by distillation, have been modified in numerous ways to achieve improvements in product yield, production rates and so forth (see, for example, U.S. Pat. No. 3,236,740 and the booklet "Industrial Alcohol by Continuous Fermentation and Vacuum Distillation With Low Energy Consumption", of Chemapec, Inc., Woodbury, N.Y.). For ethanol to realize its vast potential as a partial or total substitute for petroleum fuels or as a substitute chemical feedstock, it is necessary that the manufacturing process be as efficient in the use of energy and raw materials as possible so as to maximize the energy return for the amount of ethanol produced and enhance the standing of the ethanol as an economically viable replacement for petroleum based raw materials. To date, however, relatively little concern has been given to the energy and raw material requirements for manufacturing ethanol from biomass and consequently, little effort has been made to minimize the thermal expenditure and waste incurred in carrying out any of the aforesaid discrete operations involved in the manufacture of ethanol from vegetative sources.

Processes for the acid hydrolysis of starch to provide fermentable saccharides are known (viz, the acid starch hydrolysis processes described in U.S. Pat. Nos. 2,203,325; 2,210,659; 2,359,763; 2,393,095; 2,395,907; 2,565,404; 2,946,706; 2,954,304; 2,989,425; 3,169,083; 3,200,012; 3,236,687; 3,313,654; 3,446,664; 3,484,287; 3,607,395; and, 4,137,094). It is also known from U.S. Pat. No. 2,529,131 to subject still bottoms, or "vinasse", containing unfermented sugars to acid hydrolysis to convert said sugars to fermentable substrate. In all of the aforesaid acid hydrolysis processes, prior to conversion of the aqueous fermentable hydrolysate to ethanol employing yeast, the hydrolyzing acid must be neutralized with base. This results in the presence of relatively substantial quantities of salt in the fermentation feed, a condition which is decidedly disadvantageous for optimum ethanol production. And since the salts serve no useful function for any of the discrete operations involved in the conversion of starch to ethanol, their presence as by-products in the sugar liquor merely represents a wasteful consumption of raw materials, i.e., acid and neutralizing base.

Accordingly, there has heretofore existed a need for a process for hydrolyzing an aqueous starch slurry to a solution of fermentable sugar starch at rapid and high levels of conversion while dispensing with or minimizing the need to neutralize acid present in the sugar solution.

In addition to the foregoing disadvantage, while these and similar processes are relatively adaptable to the hydrolysis of the finely divided, relatively pure starch derived from conventional processes of wet milling cereal grains, their application to the starch-containing fractions obtained from processes of dry milling cereal grains as currently practiced would be uneconomically wasteful of the protein and edible oil associated with these fractions which in the case of corn and milo, is especially significant. Wet milling processes typically remove all but an insignificant amount of non-starch materials, i.e., protein, cellulosic fiber and oil, from the starch component of the grain, the non-starch materials finding valuable application in their own right as animal feeds and feed supplements. However, from the standpoint of producing starch for conversion to sugar, the sugar to dilute ethanol and the dilute ethanol to essentially anhydrous ethanol, conventional wet-milling processes are undesirable because of the need to ultimately remove the large amounts of process water involved.

Where, as in the case of low cost industrial ethanol, a minimal use of energy is necessary to achieve an economically viable process, a relatively energy and capital intensive process such as one based on wet-milled corn starch as the starting material can be disadvantageous. For this reason, the hydrolytic conversion of starch derived from any of the known and conventional dry milling processes is especially desirable in an industrial scale anhydrous ethanol program since these processes employ no added water beyond the moisture which is already naturally present in the grain. Thus, for example, in a typical dry corn milling process, the kernels are broken by impact and the resulting fractions made up of grits and fine feed which contain the bulk of the starch and significant quantities of oil, protein and cellulosic fiber, germ which contains most of the oil content of the kernels, and hulls which contain the major portion of the fiber, are separated employing degerminators, sifters, aspirators and gravity separators. A typical dry corn milling product analysis (pounds per bushel) is as follows:

| DRY DEGERMINATION PRODUCTS ANALYSIS ON YELLOW CORN #2, LB/100 LB (DRY BASIS) | | | | |
|---|---|---|---|---|
| | CORN | GERM | BRAN | GRITS |
| Yield, % | 100 | 10 | 8 | 82 |
| Ash | 1.63 | 0.45 | 0.32 | 0.86 |
| Fat (Oil) | 4.30 | 2.20 | 0.36 | 1.74 |
| Protein | 9.00 | 1.36 | 0.56 | 7.08 |
| Fiber | 2.56 | 0.43 | 1.20 | 0.93 |
| Starch | 72.00 | 2.80 | 2.40 | 66.80 |
| Other (Nitrogen Free Extract) | 10.51 | 2.76 | 3.16 | 4.59 |
| Total | 100.00 | 10.00 | 8.00 | 82.00 |

As this analysis indicates, the grits contain 92.8% of the starch, 78.7% of the protein and 40.5% of the oil of the whole corn kernels. Direct complete hydrolysis of the grits would therefore make these substantial amounts of protein and oil unavailable for use as comestibles.

Accordingly, there has heretofore existed a need for a process for converting starch derived from dry milled cereal grains to fermentable sugars while recovering substantially all of the protein and oil content of the starch component of the dry milled grain prior to the complete hydrolysis of the starch. The term "cereal grain" as used herein is to be understood in its commonly used sense and is inclusive of all varieties of corn (maize), milo, wheat, rice, and the like.

SUMMARY OF THE INVENTION

In accordance with the present invention, a process is provided for converting starch derived from dry milled whole grain, which starch contains varying amounts of water insoluble protein and oil depending upon the nature of the grain, and which are relatively substantial in the case of corn and milo, and relatively small amounts of one or more water soluble components selected from the group consisting of sugar, protein, vitamin and mineral, to fermentable sugar to provide substrate for the thermally efficient large-scale production of ethanol. An aqueous slurry of the starch is subjected to a preliminary strong acid catalyzed hydrolysis to provide a sterile partial starch hydrolysate containing the water insoluble protein and oil components of the starch in a substantially unaltered condition. The slurry is then separated into an aqueous partial starch hydrolysate-containing fraction and a water-insoluble protein and oil portion containing fraction. The aqueous partial starch hydrolysate fraction is thereafter subjected to a further, or final, acidic cationic exchange resin catalyzed hydrolysis to provide an aqueous solution of fermentable sugar containing little free acid. The amount of free acid which is present as a result of the preliminary hydrolysis step is of a relatively low level of magnitude and its neutralization with base will result in the production of but a correspondingly small amount of salt. Neutralization of the free acid present in the sugar liquor with ammonia provides an ammonium salt which is retained in the sugar liquor and serves to satisfy part of the nutritive requirements of the yeast employed in the fermentation of the sugar liquor to ethanol. Accordingly, such neutralization constitutes a preferred embodiment of the present invention. Among the sources of starch to which the process herein is applicable are included cassava (manioc), taro, corn, sorghum, wheat, potatoes, rice, milo, and the like.

Employing the foregoing starch hydrolysis process, only minimal quantities of fresh water need be used to accomplish conversion of the starch to fermentable sugar thus reducing the amount of water which must be removed from product ethanol obtained from the fermentation of the sugar, and consequently, the amount of thermal energy which must be expended in the manufacture of the ethanol. Moreover, substantially all of the water insoluble protein contained in the original starch can be recovered for other commercially valuable uses, notably animal feed, and due to the water recycle feature which is made possible by the process herein, a good portion of the water soluble components of the starch are retained in the solution of product fermentable sugar and are therefore available for satisfying certain nutrient requirements of the yeast employed in the fermentation of the sugar to ethanol.

The process herein with appropriate modification is also applicable to the hydrolysis of starch contained in degerminated cereal grains, i.e., grains from which a portion of the oil has been removed, dehulled grains, and degerminated and dehulled grains.

The term "strong acid" as employed herein refers to any of the inorganic acids having a pKa value of at least about 2.5 or less. The term "fermentable sugar" should be understood as referring to a single fermentable sugar such as glucose (dextrose), fructose, maltose or sucrose but more commonly will be applicable to these and similar fermentable saccharides in admixture.

BRIEF DESCRIPTION OF THE DRAWING

The accompanying drawing is a diagrammatic flow sheet illustrative of the starch hydrolysis process of the present invention as applied to corn. The process contemplates the use of known and conventional equipment which is readily available from several suppliers.

DESCRIPTION OF THE PREFERRED EMBODIMENTS

Referring to the drawing, a concentrated aqueous slurry of starch which contains from about 20 to about 50 weight percent dry substance (D.S.), and preferably from about 30 to about 40 weight percent D.S., and which also contains water insoluble protein and optionally, water soluble protein, lipid, sugars and minerals and/or such water insoluble materials as fiber, minute amounts of soil, gravel, etc., is delivered from starch slurry tank 10 by pump 11 through line 12 to steam jet mixer 13 where it is combined with steam and thereafter passed through starch liquefier 14. Pump 11 provides a discharge pressure which is substantially greater than the saturation pressure of steam at the temperature to which the slurry is heated in starch liquefier 14. Prior to introduction into steam jet mixer 13, the starch slurry is combined with a quantity of strong acid sufficient to catalyze hydrolysis, advantageously, in an amount providing a pH of from about 1.0 to about 2.5, and preferably from about 1.2 to 2.2. Suitable acids include nitric acid, sulfuric acid, hydrochloric acid and phosphoric acid. The acid is supplied from storage vessel 15 where it is moved by pump 16 through line 17 to be mixed with the starch slurry passing through line 12. The amount of steam introduced into the starch slurry through steam jet mixer 13 is sufficient to provide a temperature in starch liquefier 14 which is in the range of from about 160° F. to about 350° F., in which range the pressure of the steam can vary from about 25 psig to about 250 psig. Preferably, starch liquefier 14 is operated within the range of from about 200° F. to about 250° F. and at a pressure of from about 50 to about 150 psig. Residence time of the acidified starch slurry in liquefier 14 to effect partial hydrolysis and sterilization of the starch can vary from about 1 second to about 15 minutes and preferably from 1 second to about 1 minute.

Typically, this first preliminary hydrolysis is conducted for a period of time which will yield a slurry containing from about 12 to about 24 dextrose equivalent (D.E.), and preferably from about 16 to about 20 D.E. Under the foregoing conditions of acid hydrolysis, the accompanying water insoluble protein and oil and the water soluble components of the starch will remain largely unaffected. The partially hydrolyzed starch emerging from liquefier 14 is then conveyed through line 15 to a first centrifuge, filter or other separating device 16 where an aqueous partially hydrolyzed starch stream is recovered as underflow through line 17 to undergo a further, final hydrolysis to fermentable sugar in starch saccharifying unit 21 and a stream of protein and oil is recovered as overflow through line 8 to be washed with fresh water in overflow stream washing unit 19. The washed aqueous stream of protein and oil is then conveyed to an oil separating unit 20a, wherein the oil is removed in a known or conventional manner, e.g., extraction with a solvent such as n-hexane. The de-oiled protein stream is then passed to a second centrifuge, filter or other separating device 20b with the aqueous underflow being used as process water elsewhere in the system, e.g., for preparation of the starch slurry, and the protein which is recovered as overflow being recovered as a valuable by-product.

Saccharifying vessel 21 contains an acidic cationic exchange resin for catalyzing the further hydrolysis.

As a class, the acidic cationic exchange resins are high molecular weight polyacids which are virtually insoluble in and inert to the liquefied starch. They preferably consist of a three-dimensional hydrocarbon network to which are attached the acid groups which act as the ion exchangers. The cation exchangers can contain sulfonic, phosphonic, phosphonous, arsenic and like acid groups. Strongly acidic cation exchangers such as sulfonated cross-linked polystyrene are especially advantageous. Examples of these cationic exchangers are Amberlite IR-120 and Amberlyst 15 produced by Rohm and Haas Company, Chempro-20 and Duolite C-25 of Chemical Process Company, Dowex 50 of Dow Chemical Company, Nalcite HCR of National Aluminate Corporation and Permutit Q of Permutit Company. Sulfonated phenol-aldehyde condensation products are another form of suitable cation exchange resin which can be used in the process of the invention. The sulfonic acid group in these resins can be on a side chain, as in a —$CH_2SO_3H$ group, or attached directly to the aromatic nucleus. The first named type is made, for example, by heating together phenol, formaldehyde and a mixture of sodium sulfite and sodium metabisulfite and then adding additional phenol and formaldehyde and heating to gelation, or is made by introducing the sulfonic groups into a preformed phenol-formaldehyde condensate. The second type can be prepared by reacting a paraphenol sulfonic acid with formaldehyde and phenol and heating the resin in drying pans to remove the excess water and form cross linkages. The resin has both —$SO_3H$ and —OH groups attached to the aromatic ring.

The amount of cationic exchange resin employed in saccharifying vessel 21 is not a critical factor but ordinarily will be an amount which is required to achieve a predetermined level of fermentable sugar for a given residency time of the liquefied starch. Thus, for example, for a residency time of from about 1 to about 30 minutes after which time at least about 60 weight percent and preferably at least 80 weight percent of the original starch will have been converted to fermentable sugar, an amount of cationic exchange resin occupying from about 40% to about 90%, and preferably from about 60% to about 80% of the volume of saccharifying vessel 21, can be used. Following saccharification, the sterile sugar liquor is conveyed through line 22 to flash tank 23 where steam is flashed through line 24 to adiabatically cool the liquid mass, preferably to about 212° F. Alternatively, the vapors are passed through line 25 to direct contact water jet condenser 26 supplied with cold water through line 27 with the liquid condensate passing through line 28 to a sump sewer. The free acid present in the saccharified starch is neutralized with ammonia conveyed from storage vessel 29 by pump 30 through line 31. The ammonium nitrate, sulfate, chloride and/or phosphate which is produced by neutralization of the acid is retained in the product fermentable sugar produced by the process herein and satisfies a nutritional need of the yeast used in the conversion of the sugar to ethanol. The neutralized sugar liquor passing through line 32 is delivered by pump 33 through line 34 to storage vessel 35 (or, if desired, directly to a fermentation unit).

In a further embodiment of the present invention, stillage bottoms from a distillation unit such as described in U.S. patent application Ser. No. 043,189, filed May 29, 1979 which issued as U.S. Pat. No. 4,256,541 on Mar. 17, 1981 containing unfermentable sugar repolymerizates and/or isomers can be subjected to acid cationic exchange resin hydrolysis to convert said repolymerizates and/or isomers to fermentable sugars.

If a starch slurry is employed in the foregoing process which contains insoluble matter, such matter should be separated from the product sugar prior to the use of the latter in fermentation in order to prevent the accumulation of such matter in the fermentation vessel(s). The separation can be readily accomplished employing any of the known and conventional techniques such as filtration, centrifugation, etc. Sugar liquor in storage vessel 35 can be conveyed by pump 36 through line 37 to a fermentation unit as needed.

Fermentation of the sugar liquid herein to provide ethanol is advantageously carried out by the fermentation process disclosed in commonly assigned copending U.S. patent application Ser. No. 043,190, filed May 29, 1979 which issued as U.S. Pat. No. 4,256,591 on Mar. 17, 1981.

What is claimed is:

1. A process for converting the starch fraction derived from whole dry milled cereal grain to a sterile aqueous solution of fermentable sugar, said starch containing water insoluble protein and oil, which comprises:
   (a) liquefying an aqueous slurry of the starch in the presence of an acid hydrolysis catalyst to provide sterile aqueous partial starch hydrolysate slurry containing the water insoluble protein and oil in substantially unaltered condition;
   (b) separating the slurry resulting from liquefying step (a) into an aqueous sterile slurry of partial starch hydrolysate and an aqueous slurry of water insoluble protein and oil; and, (c) saccharifying the relatively thin aqueous slurry of partial starch hydrolysate in the presence of an acidic cationic exchange resin to provide a sterile fermentable sugar.

2. The process of claim 1, wherein the cereal grain feed for liquefying step (a) is corn or milo.

3. The process of claim 1, wherein the cereal grain feed for liquefying step (a) is dehulled corn or milo.

4. The process of claim 1, wherein the sterile aqueous solution of fermentable sugar is subjected to fermentation to provide dilute aqueous ethanol.

5. The process of claim 4, wherein the dilute aqueous ethanol is concentrated in a rectifying column with the aqueous bottoms from said rectifying column being recycled for use in a subsequent liquefying step (a).

6. The process of claim 5, wherein the concentrated ethanol is substantially dehydrated to provide anhydrous ethanol.

7. The process of claim 1, further comprising the steps of:

(d) diluting the aqueous slurry of water insoluble protein and oil resulting from step (b) with water;

(e) separating water from the water insoluble protein and oil resulting from step (d); and, (f) recycling the water recovered in step (e) for use in a subsequent liquefying step (a).

8. The process of claim 1, wherein the acid is at least one member of the group consisting of nitric acid, sulfuric acid, hydrochloric acid and phosphoric acid.

9. The process of claim 8, wherein ammonia or aqueous ammonia is added to the saccharified starch to neutralize the free acid therein and form at least one salt selected from the group consisting of ammonium nitrate, ammonium sulfate, ammonium chloride and ammonium phosphate.

10. The process of claim 1, wherein the acid cationic exchange resin is sulfonated cross-linked polystyrene or sulfonated phenol-aldehyde condensation product.

11. The process of claim 1, wherein stillage bottoms containing unfermentable sugar repolymerizates and/or isomers are subjected to saccharifying step (b) to convert said repolymerizates and/or isomers to fermentable sugar.

12. A process for converting the starch fraction derived from dry milled degerminated cereal grain to a sterile aqueous solution of fermentable sugar, said starch containing water insoluble protein, a relatively minor amount of the oil of the whole cereal grain, which comprises:

(a) liquefying an aqueous slurry of the starch in the presence of an acid hydrolysis catalyst to provide sterile aqueous partial starch hydrolysate slurry containing the water insoluble protein in substantially unaltered condition;

(b) separating the slurry resulting from liquefying step (a) into an aqueous sterile slurry of partial starch hydrolysate and an aqueous slurry of water insoluble protein;

(c) saccharifying the aqueous slurry of partial starch hydrolysate in the presence of an acidic cationic exchange resin to provide a sterile aqueous solution of fermentable sugar;

(d) diluting the aqueous slurry of water insoluble protein from step (b) with water;

(e) separating water from the water insoluble protein resulting from step (d); and, (f) recycling the water recovered in step (e) for use in a subsequent liquefying step (a).

13. The process of claim 12 wherein the cereal grain feed for liquefying step (a) is degerminated corn or milo.

14. The process of claim 12 wherein the cereal grain feed for liquefying step (a) is degerminated, dehulled corn or milo.

15. The process of claim 12 wherein the relatively minor amount of oil in the water insoluble protein fraction is removed therefrom.

16. The process of claim 1, wherein said starch further contains one of water soluble components selected from the group consisting of sugar, protein, vitamin, mineral, and any combination thereof.

17. The process of claim 12, wherein said starch further contains one of water soluble components selected from the group consisting of sugar, protein, vitamin, mineral, and any combination thereof.

* * * * *